United States Patent
Shimamura

[11] Patent Number: 6,088,476
[45] Date of Patent: Jul. 11, 2000

[54] COLOR IMAGE COMMUNICATION APPARATUS USING UNDERCOLOR REMOVAL PROCESSING

[75] Inventor: Yasuhito Shimamura, Yokohama, Japan

[73] Assignee: Canon Kabushiki Kaisha, Tokyo, Japan

[21] Appl. No.: 08/274,358

[22] Filed: Jul. 13, 1994

Related U.S. Application Data

[63] Continuation of application No. 07/794,005, Nov. 19, 1991.

[30] Foreign Application Priority Data

Nov. 21, 1990 [JP] Japan .................................... 2-318983
Nov. 21, 1990 [JP] Japan .................................... 2-318984

[51] Int. Cl.[7] .............................. H04N 1/46; H04N 1/60
[52] U.S. Cl. ............................ 382/164; 358/500; 358/529
[58] Field of Search ...................... 358/442, 435, 358/438, 439, 426, 518, 520, 539, 400, 500, 529, 504; 382/163–165; H04N 1/60, 1/46

[56] References Cited

U.S. PATENT DOCUMENTS

| | | | |
|---|---|---|---|
| 4,736,249 | 4/1988 | Iizuka et al. | 358/442 |
| 4,922,349 | 5/1990 | Abe et al. | 358/75 |
| 5,041,915 | 8/1991 | Hirota et al. | 358/438 |
| 5,057,914 | 10/1991 | Tsuji et al. | 358/500 |
| 5,067,027 | 11/1991 | Yano | 358/439 |
| 5,204,755 | 4/1993 | Taga et al. | 358/400 |
| 5,251,020 | 10/1993 | Sugiyama | 358/500 |
| 5,276,509 | 1/1994 | Mizuno et al. | 358/500 |
| 5,349,450 | 9/1994 | Yoshioka et al. | 358/500 |
| 5,357,347 | 10/1994 | Hirose et al. | 358/501 |
| 5,361,143 | 11/1994 | Nakayama et al. | 358/500 |
| 5,361,144 | 11/1994 | Sugiura | 358/500 |
| 5,392,133 | 2/1995 | Nakajima | 358/500 |
| 5,485,283 | 1/1996 | Kaneko | 358/518 |
| 5,489,998 | 2/1996 | Yamada et al. | 358/518 |

FOREIGN PATENT DOCUMENTS

| | | | |
|---|---|---|---|
| 0039518 | 3/1979 | Japan | 358/442 |
| 0022963 | 1/1990 | Japan | H04N 1/46 |

*Primary Examiner*—Kim Yen Vu
*Attorney, Agent, or Firm*—Fitzpatrick, Cella, Harper & Scinto

[57] ABSTRACT

A color image transmission apparatus designed for suitable color image processing in accordance with characteristics of a transmitting terminal has a processor for processing input color image data, and a controller for controlling the processor according to a protocol for communication with the transmitting terminal by using non-standard functions on a session layer in the protocol.

16 Claims, 7 Drawing Sheets

COLOR IMAGE COMMUNICATION APPARATUS USING UNDERCOLOR REMOVAL PROCESSING

This application is a continuation of application Ser. No. 07/794,005 filed Nov. 19, 1991.

BACKGROUND OF THE INVENTION

1. Field of the Invention

This invention relates to an apparatus for transmitting color image data to, for example, a color printer or a color monitor via a line.

2. Related Background Art

Ordinarily, a color image is copied in such a manner that a color original is first read with an optical scanner, the read image data is stored and is thereafter processed for shading correction, color correction, color conversion, density correction, black signal generation and so on before it is output to a printer or the like.

In a case where input image data is output to a monitor or the like, certain kinds of processing, e.g., black signal generation and density correction among those mentioned above are not necessary.

Thus, according to the kind of apparatus to which read color image data is output, the content of necessary image processing varies. A need for some inverse conversion processing therefore arises, for example, in a case where image data transmitted in a form such as to be output to a printer is output to a monitor.

However, kinds of image processing performed for conventional color scanners, color printers, color copiers, image processors and so on are based on respective specific systems. Even if output data prepared by image processing with an apparatus is inversely processed with another apparatus, the image cannot be restored correctly. For example, in a case where data is received after the data has been processed to be output to a printer, it is very difficult to output this data to a monitor or the like while ensuring correct color reproduction of the original.

SUMMARY OF THE INVENTION

An object of the present invention is to provide a color image communication apparatus designed to overcome the above-described problem.

Another object of the present invention is to provide a color image transmission apparatus designed for suitable color image processing in accordance with characteristics of a transmission destination terminal.

To these ends, according to a preferred embodiment of the present invention, there is disclosed a color image transmission apparatus comprising processing means for processing input color image data by color image processing in accordance with characteristics of a transmitting terminal, and means for controlling the processing means according to a protocol for communication with the transmitting terminal.

Still another object of the present invention is to provide a color image transmission apparatus capable of effecting suitable density conversion in accordance with characteristics of a transmission destination terminal.

A further object of the present invention is to provide a color image transmission apparatus designed for suitable color image communication using non-standard functions on a session layer in a protocol.

Still a further object of the present invention is to provide a color image transmission apparatus having a novel function.

Other objects and features of the present invention will become apparent from the following description of preferred embodiments thereof taken in conjunction with the accompanying drawings.

DETAILED DESCRIPTION OF THE PREFERRED EMBODIMENTS

Embodiments of the present invention will be described below with reference to the accompanying drawings.

Figure 1:
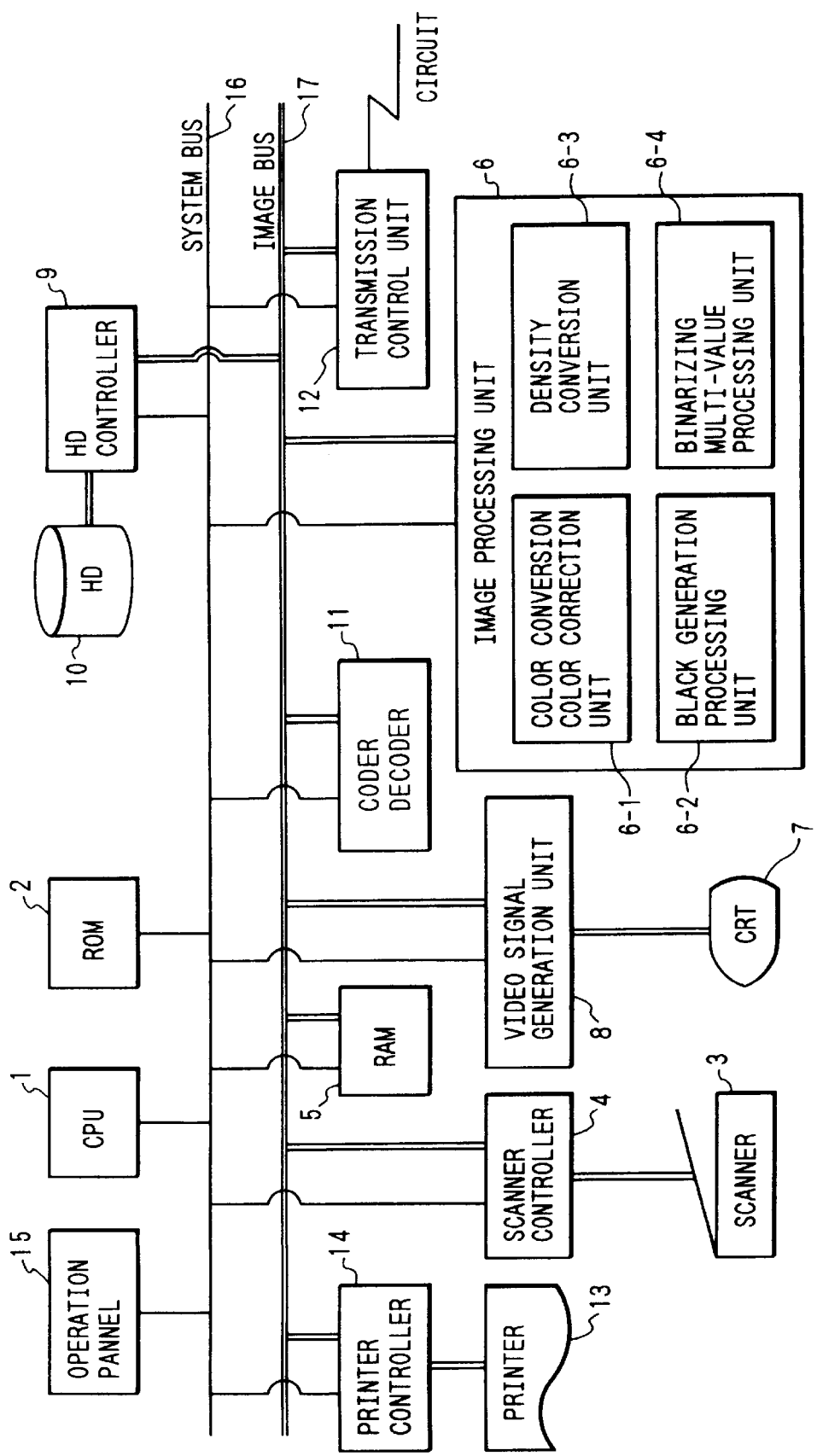
FIG. 1 is a block diagram of the constructions of hardware of an image transmission apparatus in accordance with an embodiment of the present invention.

FIG. 1 is a block diagram of the hardware construction of an image transmission apparatus in accordance with an embodiment of the present invention. A CPU (central processing unit) 1 controls the overall operation of the image transmission apparatus of this embodiment in accordance with a program stored in a ROM 2. An image to be processed for transmission is read with a color scanner 3. The scanner 3 is controlled by a controller 4 based on instructions from the CPU 1. The read image is stored in a RAM 5 and image processing, modulation/demodulation processing, communication processing and other kinds of processing are effected through the RAM 5. A part of the area of the RAM 5 is used for temporary storage of data processed by the CPU 1. An image processing unit 6 effects several kinds of processing of read image data and includes a color conversion/color correction unit 6-1, a black signal generation part (also effecting under color reduction (UCR)) 6-2, a density conversion unit 6-3, and a binarizing multi-value processing unit 6-4. The density conversion unit 6-3 comprises a gamma conversion circuit which effects gamma conversion of input data by using a look-up table or the like. When an image read with the scanner is displayed on a CRT 7, data obtained by processing the input image by color conversion and correction is input to a video signal generation unit 8. An HD controller 9 controls the operation of storing image data in a hard disk 10 by an instruction from the CPU 1. Data to be stored in the hard disk 10 has been color-modulated by a modulator-demodulator 11 (i.e., processed by multi-value color compression such as ADCT or by two-value color compression) and can directly be transmitted from a communication control unit 12 to the line. Data received from the line is stored in the hard disk 10, is demodulated by the modulator-demodulator 11 and thereafter undergoes multi-valuing processing, black signal generation processing and density conversion processing to be output through a printer 13. A printer controller 14 controls the printer operation by being instructed by the CPU 1 while establishing synchronization with the operation of the image processing unit. Through an operation panel 15, the operator inputs a transmission instruction, a received document output instruction and other instructions. Control signals are exchanged between the above-described processing units through a system bus 16. Image data is exchanged between the processing units through an image bus 17.

Figure 2:
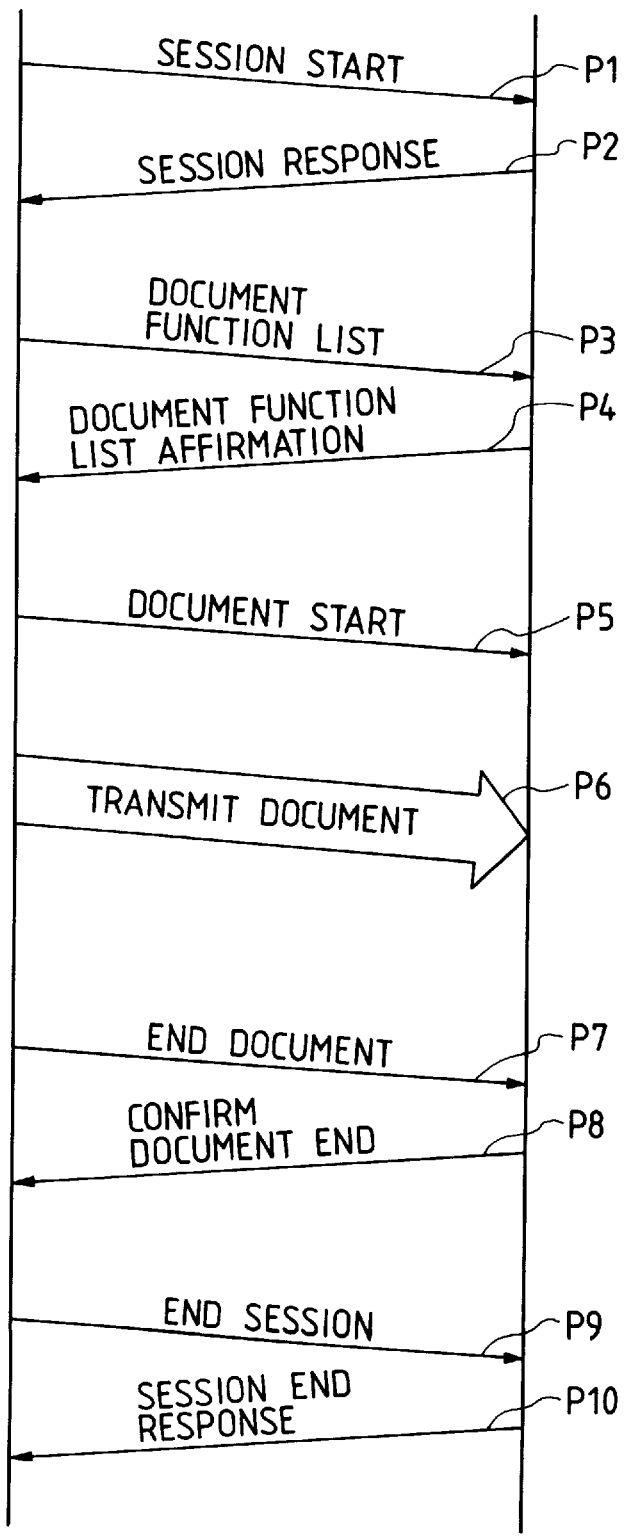
FIG. 2 is a schematic diagram of a communication protocol sequence.
Figure 3:
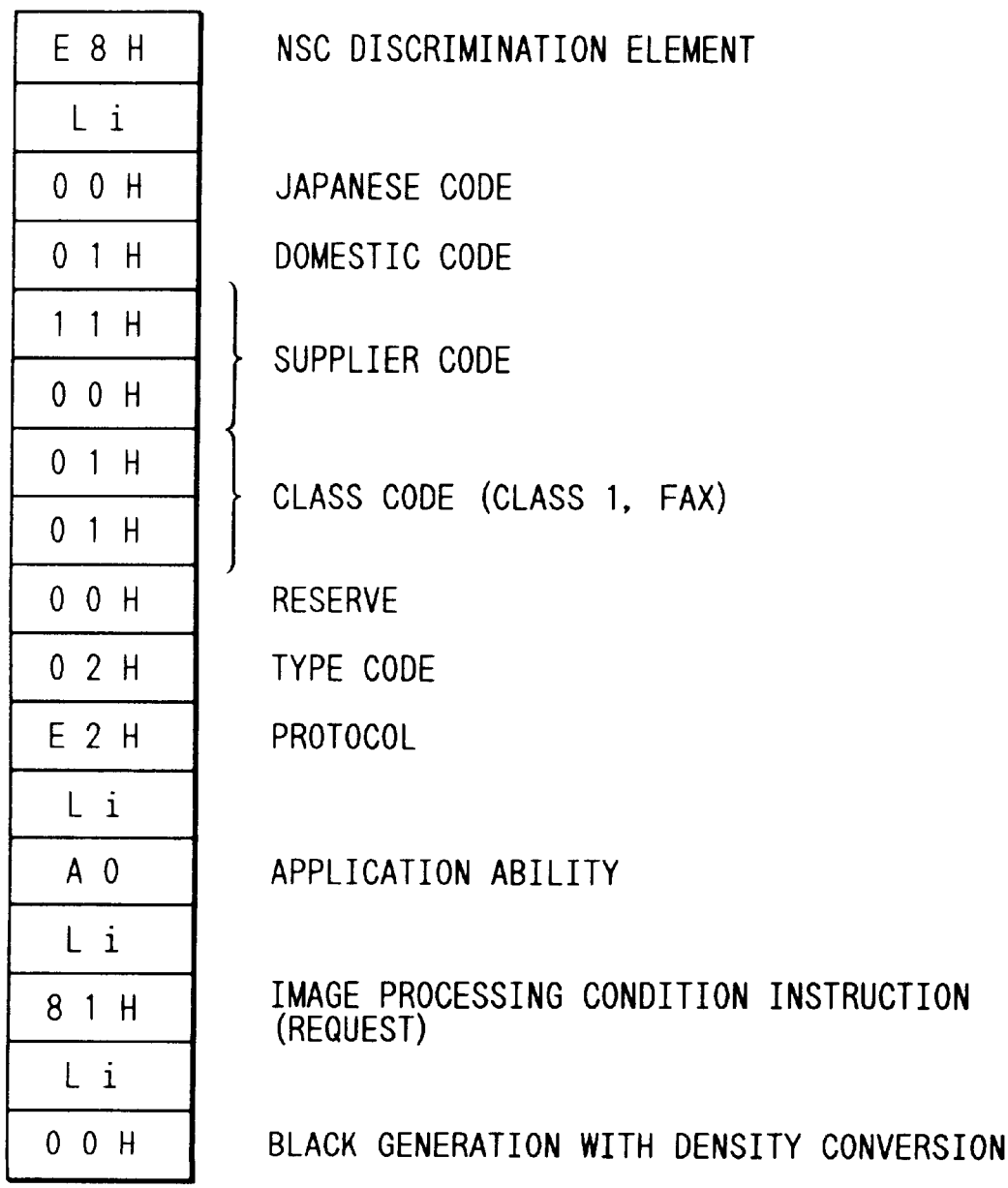
FIG. 3 is a schematic diagram of examples of non-standard function parameters.

FIG. 2 is a schematic diagram of a communication protocol sequence conducted by the communication control unit 12. The communication control unit 12 receives an instruction from the CPU to perform communication processing in accordance with this sequence. This protocol sequence is described with respect to only processing above the session layer. To start communication, a transmitting terminal sends out a session start command (CSS: P1). A receiving terminal receives CSS and sends out a session affirmation response (RSSP: P2) if it determines that communication can be started. When the transmitting terminal detects incoming of RSSP, session is started. Next, a document function list command (CDCL: P3) is issued to perform a negotiation with respect to non-basic function characteristics. In this embodiment, negotiation in a transmitted image processing state is performed with non-standard function parameters of this CDCL and a document function list affirmation response (RDCLP: P4) described below. FIG. 3 shows examples of the non-standard function parameters (NSC parameters). NSC parameters are described with respect to both CDCL and RDCLP. That is, the contents of CDCL and RDCLP are compared, and the transmitting communication apparatus controls image processing based on the result of this comparison. A Japanese code, a domestic code and a supplier code subsequent to an NSC discrimination element are codes determined in accordance with a notification of Ministry of Posts and Telecommunications. Data can freely be described as codes subsequent to these codes by a maker which is a supplier. In the case of the set of codes shown in FIG. 3, a code indicating an apparatus type is written after a class code indicating that the kind of communication apparatus is a facsimile apparatus, thereby enabling discrimination as to whether or not the apparatus has functions exemplified in this embodiment. Subsequently to the type code, a protocol function description element is written. This element indicates a protocol function with respect to document conversion performed in this session. In the example shown in FIG. 3, image processing state request/instruction are effected in this data field.

Image processing state negotiation is performed by using these NSC parameters. After the completion of negotiation, the transmitting terminal sends out a document start command (CDS: P5) and then effects document transfer P6 in image data transmission phase. The image data transmitted by this document transfer previously undergoes image processing in accordance with the agreement made by using the above NSCs. After the image data has entirely been transmitted, the transmitting terminal sends out a document end command (CDE: P7). The receiving terminal receives the CDE and sends out a document end confirmation response (RDEP: P8) if it determines that the reception can be terminated. The transmitting terminal receives the RDEP and sends out a session end command (CSE: P9) if it determines that release from the session is allowed. The transmitting terminal detects incoming of the session end response (RSEP: P10) from the receiving terminal to terminate all the transmission processings at the session level.

Figure 4A:
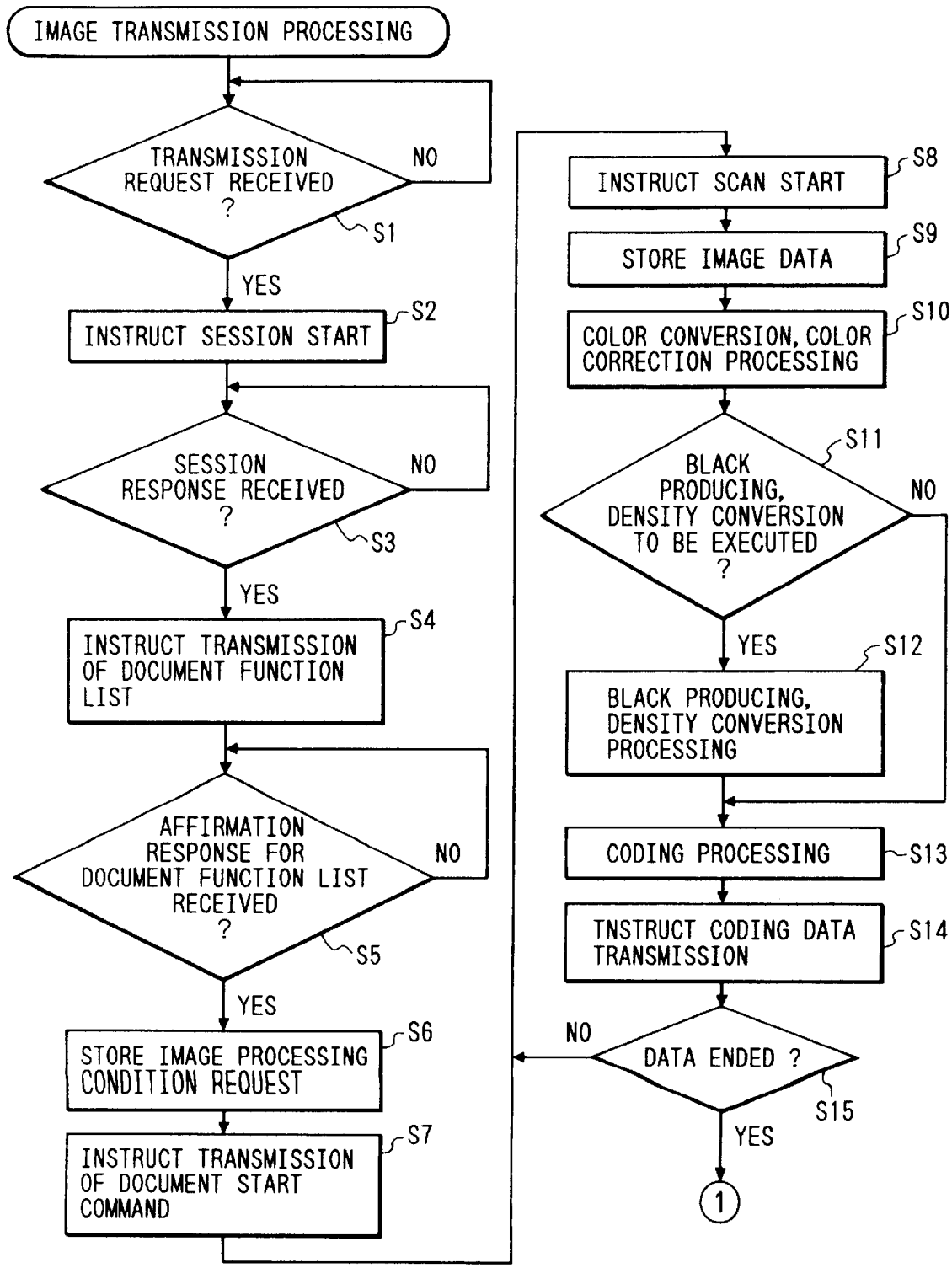
FIGS. 4A and 4B are flow charts of a control sequence for image transmission processing.
Figure 4B:
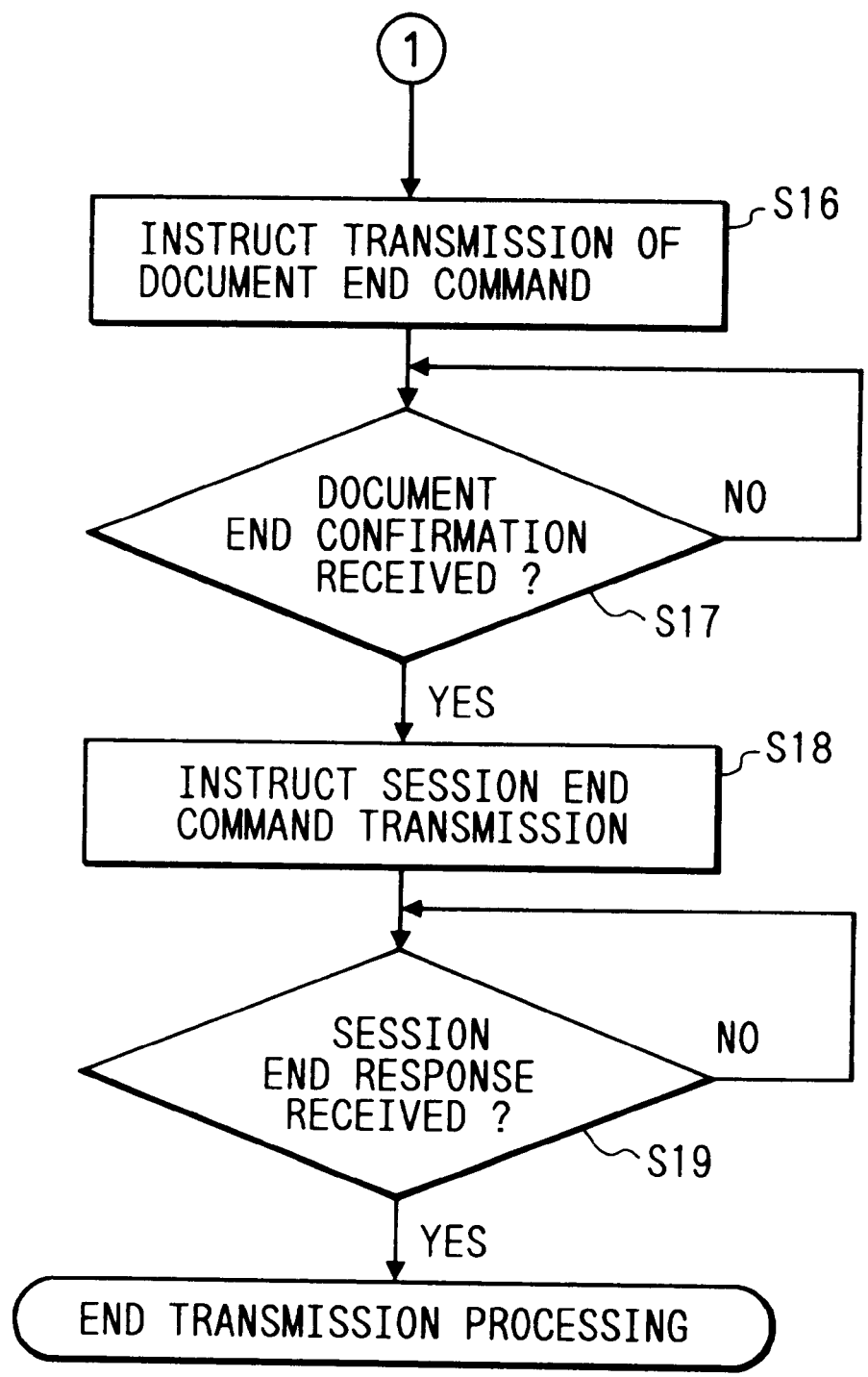
Figure 5:
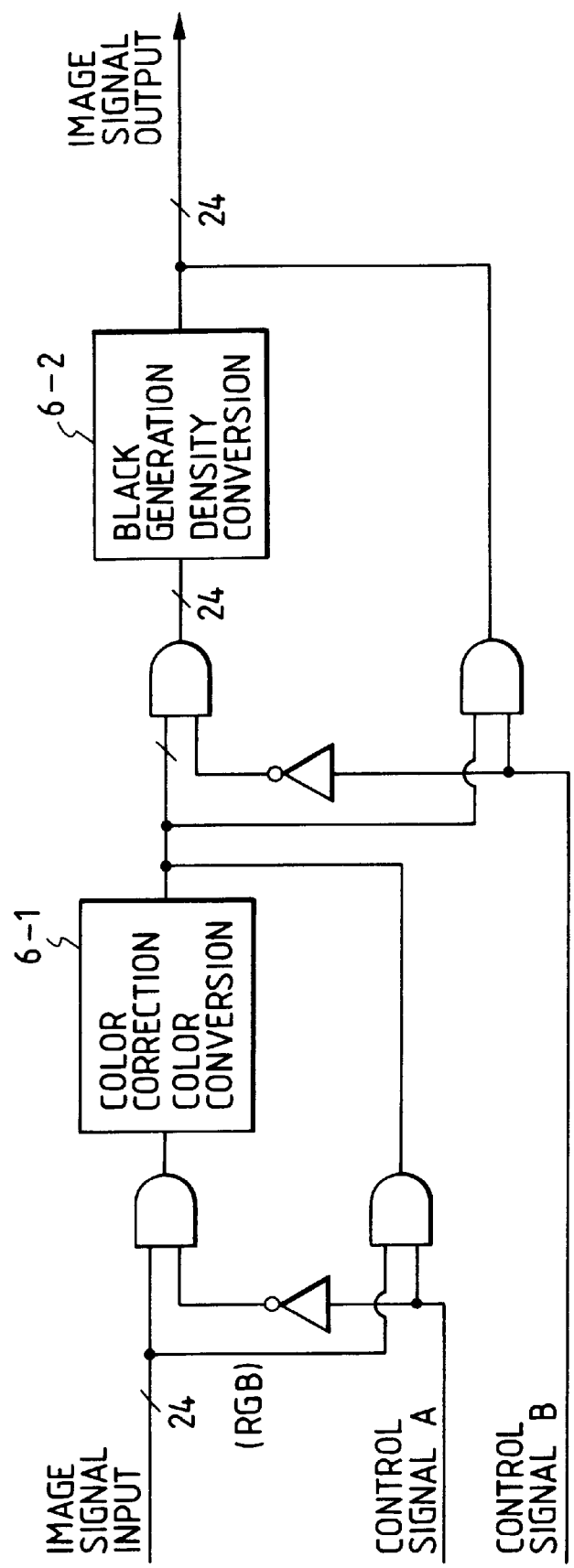
FIG. 5 is a diagram of a circuit with which processing selection using a control signal is realized.

FIG. 4 is a flow chart showing a control sequence for image transmission processing. To start transmission processing, determination is made in step S1 as to whether or not there is a need for transmission operation. In step S2, if there is a transmission request, the CPU 1 instructs the communication control unit 12 to start the session. The communication control unit 12 then sends out CSS (P1). In step S3, a response from the apparatus at the other end of the line is awaited. When the communication control unit detects incoming of RSSP (P2), it informs the CPU of this detection, and the process then proceeds to step S4 in which the communication control unit is instructed to send out CDCL. At this time, processing is performed so that NSCs are set as parameters of CDCL. When the communication control unit receives RDCLP (P4) from the other-end terminal after it has sent out P3 CDCL by the instruction in step S4, it informs the CPU in the RDCLP incoming waiting state in step S5 of this incoming. In step S6, the CPU analyzes NSC parameters in RDCLP, and stores the request from the other-end terminal with respect to the image processing state. By the above sequence, the negotiation phase is terminated. CDS sending instruction is then effected in step S7, and the process proceeds into the image data transmission phase. In step S8, the CPU instructs the scanner controller 4 to start scanning an original. When the scanner 3 starts inputting image data by receiving this instruction, the image data is stored in the RAM 5 in step S9. In step S10, the image data in the RAM 5 is processed by the image processing unit 6 for color conversion and color correction, and the process proceeds to step S11. In step S11, a flow is selected with respect to whether or not the image data is processed for black signal generation and density conversion according to the result of negotiation of the image processing state which result is stored in step S6. More specifically, codes designating black signal generation/density conversion processing as shown in FIG. 3 are discriminated. If this processing is performed, the process proceeds to step S12. If this processing is not performed, the process proceeds to step S13 by skipping step S12. FIG. 5 is a circuit diagram of an example of hardware with which the CPU effects processing selection in S11 by using control signals. A control signal A shown in FIG. 5 serves as a selection signal for determination as to whether or not a black signal generation circuit is used, and a control signal B serves as a selection signal for determination as to whether or not a density conversion circuit is used. When the control signal A is on, no image signal is output through an AND gate in front of the black signal generation circuit while the input image signal is directly output through a gate below. Conversely, when the control signal A is off, the image signal flows through the upper AND gate and is processed in the black signal generation circuit to be output to the next circuit. The control signal B has the same effect; when the control signal B is on, the image signal is output without flowing through the density conversion circuit; and, when the control signal is off, the image signal flows through the upper AND gate and is output from the density conversion circuit. The processing of this embodiment is realized by providing in the image processing unit 6 a circuit such as that shown in FIG. 5 and such that the status of each control signal A or B can be set by an instruction from the CPU. The black signal generation circuit and the density conversion circuit shown in FIG. 5 correspond respectively to the units 6-2 and 6-3 shown in FIG. 1. In step S12, the image data is supplied to both these two processing units. In step S13, the image data processed by these kinds of processing is color-modulated by the modulator-demodulator 11. In step S14, the communication control unit 12 is instructed to send out the modulated data to the line. This operation corresponds to P6 of the protocol sequence. Next, in step S15, determination is made as to whether or not there is any remaining portion of the original to be scanned. If a portion to be scanned is left, the processing of steps S8 to S14 is repeated. If no portion to be scanned, the process proceeds to step S16. In step S16, the CPU sends a document end command to the communication control unit. The communication control unit sends out CDE (P7) and, at the time of incoming of RDEP (P8) from the other-end terminal, in step S17, informs the CPU in the RDEP waiting state of this incoming. The CPU then issues a CSE (P9) sending instruction in step S18, and waits for information from the communication control unit of detection of incoming of RSEP (P10). When the CPU is informed of incoming of RSEP, it terminates the transmission processing.

In this embodiment, negotiation of the image processing state is performed with NSC parameters of CDCL and RDCLP. However, it is possible to perform negotiation by using user information in the case of a different protocol data unit, e.g., ISDN.

In this embodiment, each of black signal generation processing and density conversion processing can be separately selected by using an AND gate, but the arrangement may be such that these processings may be collectively selected.

According to the embodiment described above, suitable color image processing in accordance with the characteristics of the transmitting terminal can be selected automatically on the transmitting side, thus achieving an improvement in handling.

In the above-described flow chart shown in FIG. 4, scanning of the original is started in S8 subsequent to the document start command sending instruction in S7, but this is not exclusive. The process may alternatively be such that the original is previously scanned to accumulate image data, that is, the flow of steps S8 and S9 is previously executed, and thereafter the session start commanding and subsequent operations are effected.

A second embodiment of the present invention will be described below with reference to FIG. 6.

The hardware construction of this embodiment is the same as that of the above-described embodiment shown in FIG. 1, and the description for it will not be repeated.

Figure 6:
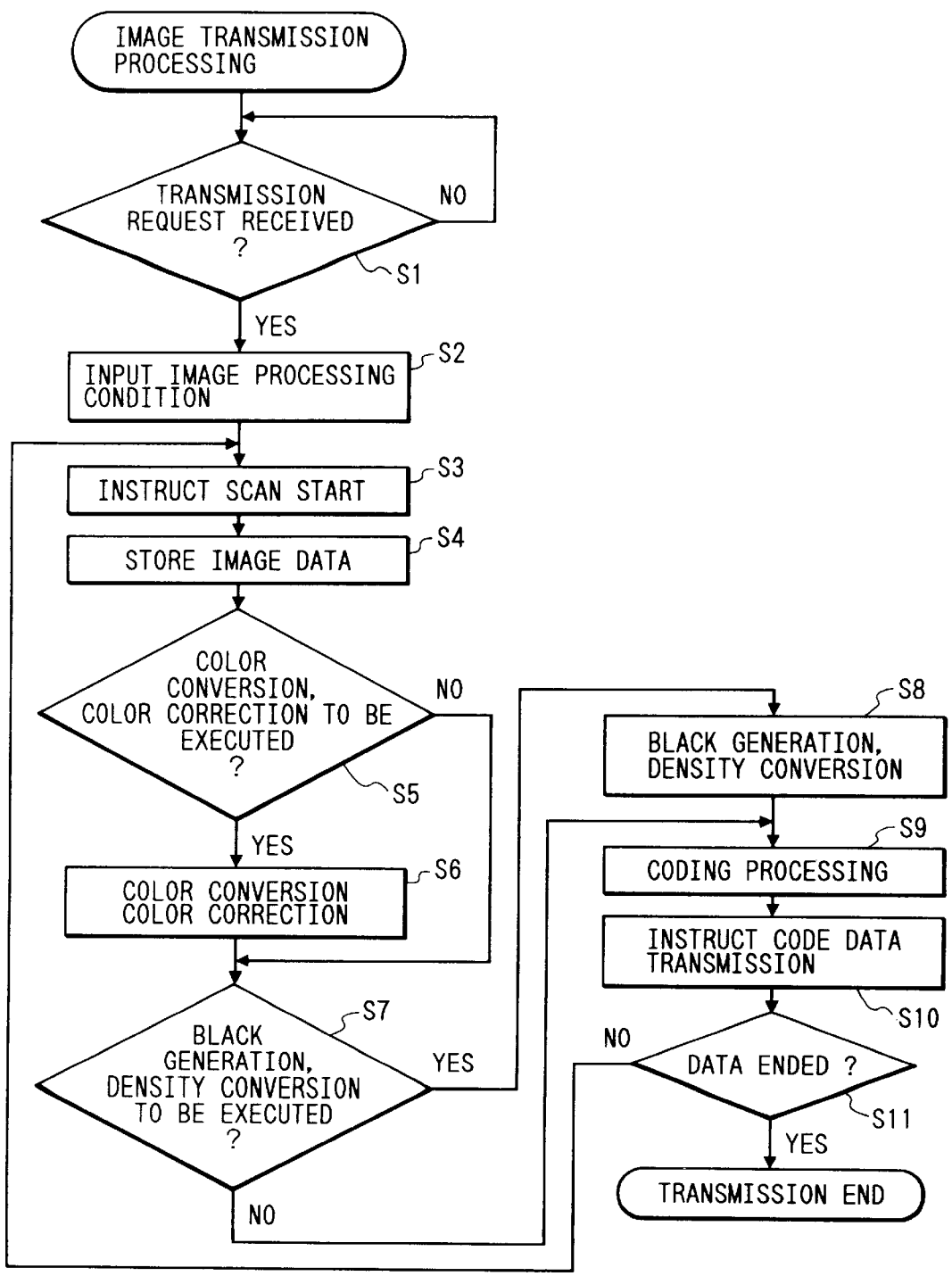
FIG. 6 is a flow chart of another example of the control sequence shown in FIG. 4.

FIG. 6 is a flow chart showing a control sequence for image transmission processing in accordance with the second embodiment of the present invention. To start transmission processing, determination is made in step S1 as to whether or not there is a need for transmission operation. If a transmission request is recognized, instructions from the operator with respect to image processing conditions are input in step S2. These operations are effected on the operation panel 15 and necessary data is input to the CPU. The image processing conditions input in step S2 are used for later-described processing selection in the image processing unit. After the completion of input through the operation panel, the process proceeds to step S3 and the CPU instructs the scanner controller 4 to start scanning an original. When the scanner starts inputting image data by receiving this instruction, the image data is stored in the RAM 5 in step S4. In step S5, determination is made from the image processing conditions previously input as to whether or not the image data in the RAM 5 is processed for color conversion and color correction. If this processing is performed, the process proceeds to step S6. Color conversion and color correction can be performed while receiving requests from the operator through the operation panel. It is also possible to observe the scanned image and the results of color conversion and correction by occasionally displaying them on the CRT 7 to control the processing as desired. If these kinds of processing are not performed, the process proceeds directly to the next step S7. In step S7, examination is made as to whether or not the transmitted data is processed for black signal generation and density conversion according to the image processing conditions previously input, thereby effecting processing selection. If an instruction has been given to perform these kinds of processing, the process proceeds to step S8. If no such instruction has been given, the process proceeds to step S9. For processing of step S8, the image data is processed through the black signal generation unit 6-2 and the density conversion unit 6-3 in the image processing unit. In step S9, the image data is encoded by the modulator-demodulator 11. In step S10, the communication control unit 12 is instructed to send out the encoded data to the line. In step S11, determination is made as to whether or not there is any remaining portion of the original to be scanned. If a portion to be scanned is left, the processing of steps S3 to S10 is repeated. If no portion to be scanned, the transmission processing is terminated.

In this embodiment, processing selection conditions are input by the operator. However, the arrangement may be such that the sates of the control signals shown in FIG. 5 are directly determined by a hardware means using dip switches. Further, the arrangement may alternatively be such that the switch constituted of the AND gate in front of the color correction/conversion circuit shown in FIG. 5 is removed and, with the corresponding processing, processing for black signal generation and density conversion is always selected.

According to this embodiment, color image processing corresponding to the output unit on the transmitting side can be selected, so that a high-quality image can be output on the receiving side.

In this embodiment, the color modulation/demodulation processing may be multi-color compression or two-value color compression.

Also, the line for transmission from the communication control unit of this embodiment may be a digital line or an analog line.

Black signal generation, color correction and density conversion have been mentioned as examples of color image processing with respect to the embodiment, but these are not exclusive. Other kinds of color processing, e.g., processing for color-monochrome conversion or conversion from RGB to Lab may be performed.

What is claimed is:

1. A color image communication apparatus comprising:

input means for inputting color image data representing a target color;

color processing means for color processing the input color image data according to a selected one of a plurality of color processing methods for correction/conversion to provide color processed image data representing the target color;

discriminating means for discriminating a kind of color processing function for a color image reproduction of a receiving terminal by using a protocol for communication with the receiving terminal;

control means for controlling said color processing means to select one of the color processing methods according to a discrimination result of said discriminating means; and transmitting means for transmitting the color processed image data to the receiving terminal.

2. A color image communication apparatus according to claim 1, wherein said processing means further includes a density conversion means.

3. A color image communication apparatus according to claim 2, wherein said density conversion means includes a gamma conversion circuit.

4. A color image communication apparatus according to claim 1, further comprising:

receiving means for receiving image data from an external apparatus, said color processing means processing the received image data to provide processed image data; and image forming means for forming an image on the basis of the processed image data.

5. A color image communication apparatus according to claim 1, wherein said input means includes a color scanner.

6. A color image communication apparatus according to claim 1, further comprising encoding means for encoding data processed by said color processing means.

7. A color image communication apparatus according to claim 1, wherein a non-standard function parameter of a session layer is used for said protocol.

8. A color image communication method comprising the steps of:

inputting color image data representing a target color;

color processing the input color image data according to a selected one of a plurality of color processing methods for correction/conversion to provide color processed image data representing the target color;

discriminating a kind of color processing function for a color image reproduction of a receiving terminal by using a protocol for communication with the receiving terminal;

controlling said color processing step to select one of the color processing methods according to a discrimination result of said discriminating step; and transmitting the color processed image data to the receiving terminal.

9. A color image communication method comprising:

color processing input color image data by a selected one of a first method, using under color removal processing and providing first processed image data, and a second method, not using under color removal processing and providing second processed image data;

receiving information relating to an under color removal processing function of a receiving terminal by using a protocol for communication with the receiving terminal;

selecting either the first or second method for use by said processing step to provide the first or second processed image data, respectively, as selected processed image data; and transmitting the color image data output at said color processing step to the receiving terminal.

10. A color image communication apparatus comprising:

color processing means for color processing input color image data by a selected one of a first method, using under color removal processing and providing first processed image data, and a second method, not using under color removal processing and providing second processed image data;

receiving means for receiving information relating to an under color removal processing function of a receiving terminal by using a protocol for communication with the receiving terminal;

means for selecting, in accordance with the information, either the first or second method for use by said processing means to provide the first or second processed image data, respectively, as selected processed image data; and transmitting means for transmitting the color image data output from said color processing means to the receiving terminal.

11. A color image communication apparatus according to claim 10, wherein said selection means selects transmission of under color removal processed image data by said processing means, or transmission of non under color removal processed image data according to a manual operation.

12. A color image communication apparatus according to claim 10, further comprising input means for inputting the color image data.

13. A color image communication apparatus according to claim 12, wherein said input means includes a color scanner.

14. A color image communication apparatus according to claim 10, further comprising encoding means for encoding data processed by said processing means.

15. A color image communication apparatus according to claim 10, wherein said processing means further includes a density conversion means.

16. A color image communication apparatus according to claim 15, wherein said density conversion means includes a gamma conversion circuit.

* * * * *

UNITED STATES PATENT AND TRADEMARK OFFICE
CERTIFICATE OF CORRECTION

PATENT NO. : 6,088,476
DATED : July 11, 2000
INVENTOR(S) : YASUHITO SHIMAMURA

It is certified that error appears in the above-identified patent and that said Letters Patent is hereby corrected as shown below:

[COLUMN 8]

Line 38, "said" should read --said color--.

Signed and Sealed this

Seventeenth Day of April, 2001

Attest:

NICHOLAS P. GODICI

Attesting Officer    Acting Director of the United States Patent and Trademark Office